(12) United States Patent
Kreitzer (10) Patent No.: US 6,301,057 B1
(45) Date of Patent: Oct. 9, 2001

(54) LONG FOCAL LENGTH PROJECTION LENSES

(75) Inventor: Melvyn H. Kreitzer, Cincinnati, OH (US)

(73) Assignee: Corning Precision Lens, Cincinnati, OH (US)

( * ) Notice: Subject to any disclaimer, the term of this patent is extended or adjusted under 35 U.S.C. 154(b) by 0 days.

(21) Appl. No.: 09/494,228

(22) Filed: Jan. 31, 2000

Related U.S. Application Data (60) Provisional application No. 60/118,288, filed on Feb. 2, 1999.

(51) Int. Cl.$^7$ ................................. G02B 3/00; G02B 9/00
(52) U.S. Cl. ............................................. 359/649; 359/714
(58) Field of Search .................... 359/749, 750, 359/751, 708, 713, 714

(56) References Cited

U.S. PATENT DOCUMENTS

| | | | |
|---|---|---|---|
| 4,189,211 | 2/1980 | Taylor | 359/663 |
| 5,042,929 | 8/1991 | Tanaka et al. | 359/702 |
| 5,179,473 | 1/1993 | Yano et al. | 359/691 |
| 5,200,861 | 4/1993 | Moskovich | 359/662 |
| 5,218,480 | 6/1993 | Moskovich | 359/753 |
| 5,278,698 | 1/1994 | Iizuka et al. | 359/682 |
| 5,313,330 | 5/1994 | Betensky | 359/676 |
| 5,329,363 * | 7/1994 | Moskovich | 359/649 |
| 5,331,462 | 7/1994 | Yano | 359/689 |
| 5,455,713 * | 10/1995 | Kreitzer | 359/649 |
| 5,625,495 | 4/1997 | Moskovich | 359/663 |
| 5,900,989 | 5/1999 | Kreitzer | 359/691 |
| 5,969,847 | 10/1999 | Moskovich | 359/651 |
| 6,046,860 * | 4/2000 | Hirata et al. | 359/649 |

FOREIGN PATENT DOCUMENTS

| | | |
|---|---|---|
| 809407 | 11/1997 | (EP). |
| WO97/41461 | 11/1997 | (WO). |
| WO98/34134 | 8/1998 | (WO). |

* cited by examiner

Primary Examiner—Jordan M. Schwartz
(74) Attorney, Agent, or Firm—Maurice M. Klee (57) ABSTRACT

A projection lens for use with LCD or DMD panels is provided. The lens has three lens units, the first unit having a weak power and at least one aspheric surface, the second unit having a positive power, a high dispersion negative lens element, and a low dispersion positive lens element, and the third unit having a negative power, a positive meniscus lens element and a negative lens element. The projection lens satisfies the following relationships:

$f_0/|f_1|<0.6$; and $BFL/f_0>0.3$ where (i) $f_0$ is the effective focal length of the combination of the first, second, and third lens units; (ii) $f_1$ is the effective focal length of the first lens unit; and (iii) BFL is the back focal length of the combination of the first, second, and third lens units for an object located at infinity along the long conjugate side of the projection lens.

21 Claims, 6 Drawing Sheets

LONG FOCAL LENGTH PROJECTION LENSES

CROSS REFERENCE TO RELATED PROVISIONAL APPLICATION

This application claims the benefit under 35 USC §119(e) of U.S. Provisional Application Ser. No.60/118,288 filed Feb. 2, 1999, the content of which in its entirety is hereby incorporated by reference.

FIELD OF THE INVENTION

This invention relates to projection lenses and, in particular, to projection lenses which can be used, inter alia to form an image of an object composed of pixels, such as, a LCD or DMD.

BACKGROUND OF THE INVENTION

Figure 5:
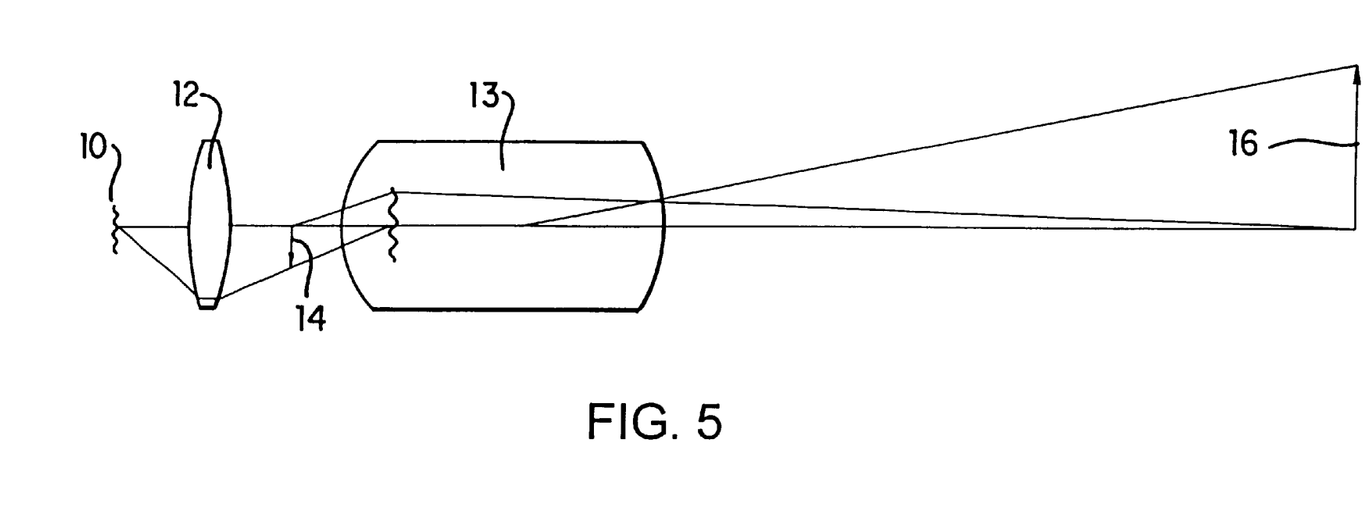
FIG. 5 is a schematic diagram showing an overall projection lens system in which the projection lens of the present invention can be used.

Projection lens systems (also referred to herein as "projection systems") are used to form an image of an object on a viewing screen. The basic structure of such a system is shown in FIG. 5, wherein 10 is a light source (e.g., a tungsten-halogen lamp), 12 is illumination optics which forms an image of the light source (hereinafter referred to as the "output" of the illumination system), 14 is the object which is to be projected (e.g., a matrix of on and off pixels), and 13 is a projection lens, composed of multiple lens elements, which forms an enlarged image of object 14 on viewing screen 16. The system can also include a field lens, e.g., a Fresnel lens, in the vicinity of the pixelized panel to direct the exit pupil of the illumination system towards the entrance pupil of the projection lens.

FIG. 5 is drawn for the case of a LCD panel where the output of the illumination system strikes the back of the panel and passes through those pixels of the panel which are transparent. DMDs, on the other hand, work by reflection and thus the output of the illumination system is routed to the front of the panel by a prism or similar device.

Projection lens systems in which the object is a pixelized panel are used in a variety of applications, including data display systems. Such projection lens systems preferably employ a single projection lens which forms an image of either a single panel having, for example, red, green, and blue pixels, or three individual panels, one for each color. In some cases, two panels are used, one for two colors, e.g., red and green, and the other for one color, e.g., blue. A spinning filter wheel or similar device is associated with the panel for the two colors and the panel is alternately fed information for the two colors in synchrony with the rotating filter.

There exists a need for a projection lens for use with a pixelized panel which simultaneously has at least the following properties: (1) a long focal length; (2) a long back focal length; (3) the ability to operate (focus) at various magnifications (conjugates) while maintaining an efficient coupling to the output of the illumination system and a high level of aberration correction (hereinafter referred to as the "lens' focus range"); (4) a relatively small size, including a small number of lens elements, a relatively small barrel length, and a relatively small maximum lens diameter; (5) a high level of color correction; and (6) low distortion.

A long focal length is needed for projection systems which are to be used in theaters, conference halls, and the like. In such settings, the projection system is typically located at the back of the hall so that the throw distance from the lens to the viewing screen is long. For a given panel size and screen size, i.e., a given magnification, the longer the focal length, the longer the throw distance. Accordingly, for a given range of magnifications, the focal length of the lens must increase as the throw distance increases.

A long back focal length, i.e., the distance from the last lens surface to the pixelized panel, is needed, especially where multiple panels are used, to accommodate the optical elements, e.g., filters, beam splitters, prisms, and the like, used in combining the light from the different color optical paths which the lens system projects towards the viewing screen. In addition, a long back focal length allows the output of the illumination system to be in the vicinity of the projection lens for output distances which are relatively large. Relatively large output distances are desirable since they provide relatively shallow entrance angles for the light at the pixelized panel which is especially important in the case of LCD panels.

A projection lens which can efficiently operate at various magnifications, i.e., a lens which has a large focus range, is desirable since it allows the projection system to be used with screens of different sizes and halls of different dimensions without the need to change any of the components of the system. Only the object and image conjugates need to be changed which can be readily accomplished by moving the lens relative to the pixelized panel. The challenge, of course, is to provide efficient coupling to the output of the illumination system and a high level of aberration correction throughout the operative range of magnifications.

A relatively small projection lens is desirable from a cost, weight, and size point of view. Large numbers of lens elements and elements having large diameters consume more raw materials, weigh more, and are more expensive to build and mount. Long barrel lengths normally increase the overall size of the projection system, which again leads to increased cost and weight. Accordingly, a lens with a minimum number of relatively small lens elements, located relatively close to one another, is desired.

A high level of color correction is important because color aberrations can be easily seen in the image of a pixelized panel as a smudging of a pixel or, in extreme cases, the complete dropping of a pixel from the image. These problems are typically most severe at the edges of the field. In general terms, the color correction, as measured at the pixelized panel, should be better than about a pixel and, preferably, better than about a half a pixel to avoid these problems.

All of the chromatic aberrations of the system need to be addressed, with lateral color, chromatic variation of coma, and chromatic aberration of astigmatism typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction is thus needed from the projection lens.

It should be noted that color aberrations become more difficult to correct as the focal length of the projection lens increases. Thus, the first and fifth criteria discussed above, i.e., a long focal length and a high level of color correction, work against one another in arriving at a suitable lens design.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center. Moreover, projection lenses are often used with offset panels, the lenses of FIGS. 1–4 being, for example, designed for such use. In such a case, the distortion at the viewing screen does not vary symmetrically about a horizontal line through the center of the screen but can increase monotonically from, for example, the bottom to the top of the screen. This effect makes even a small amount of distortion readily visible to the viewer.

The projection lenses described below achieve all of the above requirements and can be successfully used in producing relatively low cost projection lens systems capable of forming a high quality color image of a pixelized panel on a viewing screen.

DESCRIPTION OF THE PRIOR ART

Projection lenses for use with pixelized panels are described in various patents including Taylor, U.S. Pat. No. 4,189,211, Tanaka et al., U.S. Pat. No. 5,042,929, Yano et al., U.S. Pat. No. 5,179,473, Moskovich, U.S. Pat. No. 5,200,861, Moskovich, U.S. Pat. No. 5,218,480, Iizuka et al., U.S. Pat. No. 5,278,698, Betensky, U.S. Pat. No. 5,313,330, Yano, U.S. Pat. No. 5,331,462, Moskovich, U.S. Pat. No. 5,625,495, Moskovich, 5,841,587, EPO Patent Publication No. 0809407, and PCT Patent Publications Nos. WO97/41461 and WO98/34134. Discussions of LCD systems can be found in Gagnon et al., U.S. Pat. No. 4,425,028, Gagnon, U.S. Pat. No. 4,461,542, Ledebuhr, U.S. Pat. No. 4,826,311, and EPO Patent Publication No. 311,116.

SUMMARY OF THE INVENTION

In view of the foregoing, it is an object of the present invention to provide improved projection lenses for use with a pixelized panel which simultaneously have each of the six desired properties discussed above. This object is achieved by means of a projection lens which, in order from its image side to its object side (i.e., from its long conjugate side to its short conjugate side), comprises:

(A) a first lens unit having a weak power and comprising at least one aspheric surface;

(B) a second lens unit having a positive power and comprising a negative lens element composed of a high dispersion material and a positive lens element composed of a low dispersion material;

(C) a third lens unit having a negative power and comprising a positive meniscus lens element and a negative lens element; and (D) an optional field lens which is nearer to the object than to the third lens unit.

Preferably, the projection lens consists of just the foregoing three lens units and optional field lens. Most preferably, the first lens unit consists of a single lens element and the second and third lens units each consists of two lens elements having the above specified powers. Even more preferably, the two lens elements of the second lens unit are in the order negative/positive, while those of the third lens unit are in the order positive/negative.

In further preferred embodiments, the projection lens satisfies at least some and preferably all of the following numerical limitations:

$f_0/|f_1|<0.6$ (1)

$BFL/f_0>0.3$ (2)

$D2_{12}<D_{12}$ (3)

$D2_{12}<D_{23}$ (4)

$D3_{12}<D_{23}$ (5)

where:

(i) $f_0$ is the effective focal length of the combination of the first, second, and third lens units;

(ii) $f_1$ is the effective focal length of the first lens unit;

(iii) BFL is the back focal length of the combination of the first, second, and third lens units for an object located at infinity along the long conjugate side of the projection lens;

(iv) $D_{12}$ is the distance between the first and second lens units measured from the last surface of the first unit to the first surface of the second unit;

(v) $D_{23}$ is the distance between the second and third lens units measured from the last surface of the second unit to the first surface of the third unit;

(vi) $D2_{12}$ is the distance between the negative and positive lens elements of the second lens unit measured between the facing surfaces of those elements; and (vii) $D3_{12}$ is the distance between the negative and positive lens elements of the third lens unit measured between the facing surfaces of those elements.

In still further preferred embodiments, $f_0/|f_1|$ is less than about 0.2, $BFL/f_0$ is greater than about 0.5, and $D2_{12}$ is less than both $0.5 \cdot D_{12}$ and $0.5 \cdot D_{23}$. Even more preferably, $D2_{12}$ is less than both $0.3 \cdot D_{12}$ and $0.3 \cdot D_{23}$.

In certain embodiments, the projection lenses of the invention are designed using the location of the output of the illumination system as a pseudo-aperture stop/entrance pupil of the projection lens (see Betensky, U.S. Pat. No. 5,313,330, the relevant portions of which are incorporated herein by reference). In this way, efficient coupling is achieved between the light output of the illumination system and the projection lens. The projection lenses of FIGS. 1–4 were designed in this way.

In accordance with these embodiments, the invention provides a projection lens system which forms an image of an object and comprises:

(a) an illumination system comprising a light source and illumination optics which forms an image of the light source, said image being the output of the illumination system;

(b) a pixelized panel which comprises the object; and (c) a projection lens of the type described above, said projection lens having an entrance pupil whose location substantially corresponds to the location of the output of the illumination system.

Figure 2:
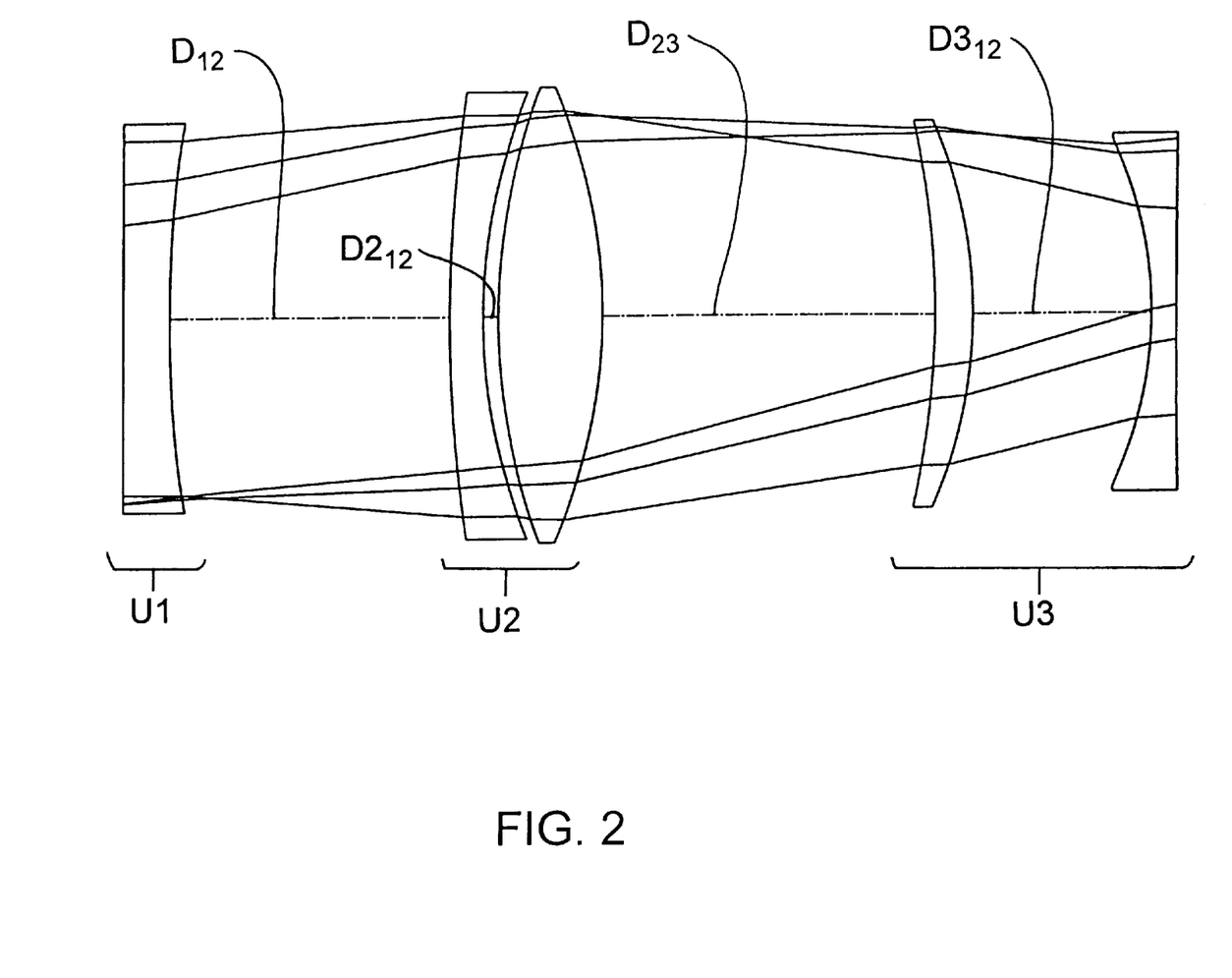
FIGS. 2–4 are schematic side views of further projection lenses constructed in accordance with the invention. These lenses are combined with a pixelized panel in the same manner as illustrated in FIG. 1B for the lens of FIG. 1A.
Figure 3:
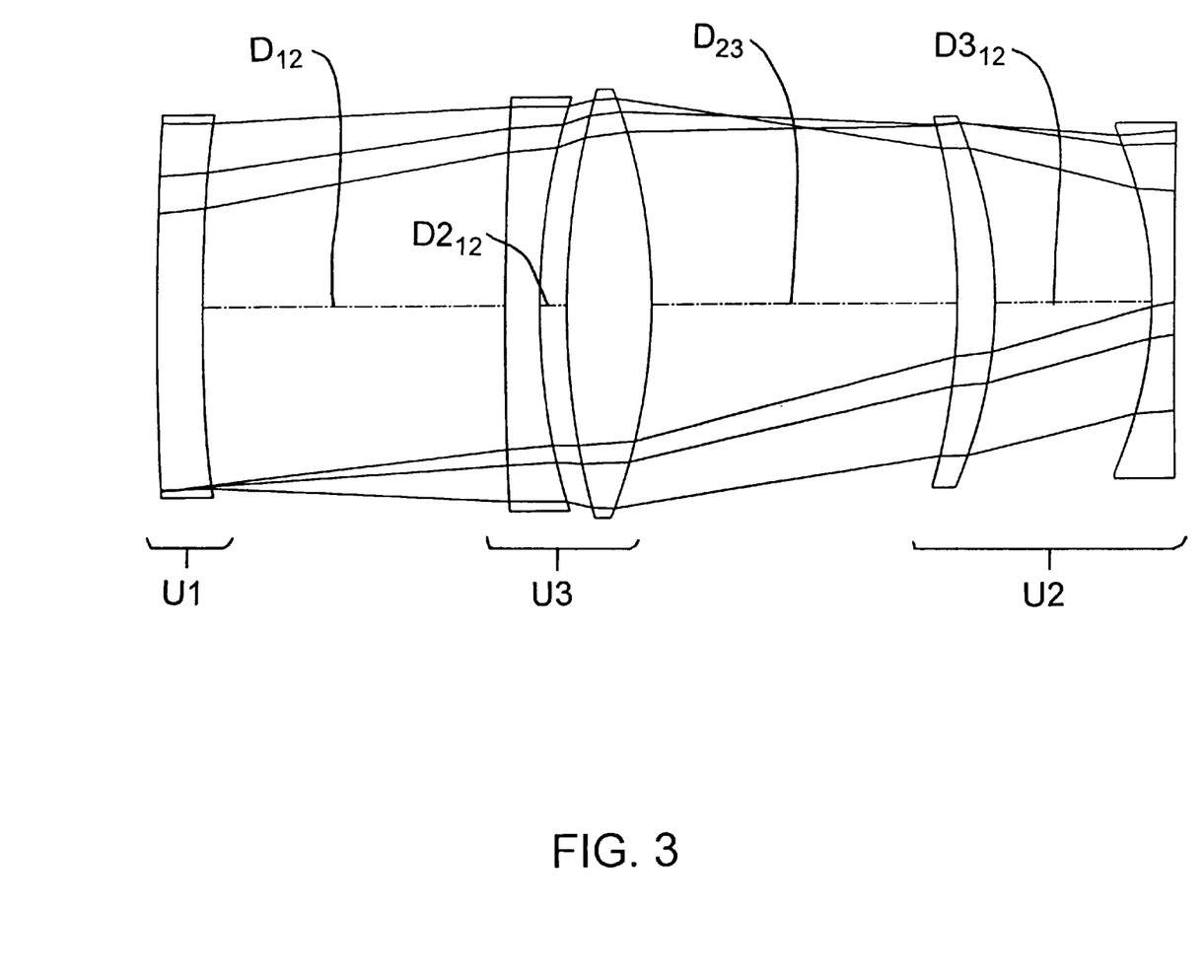
Figure 4:
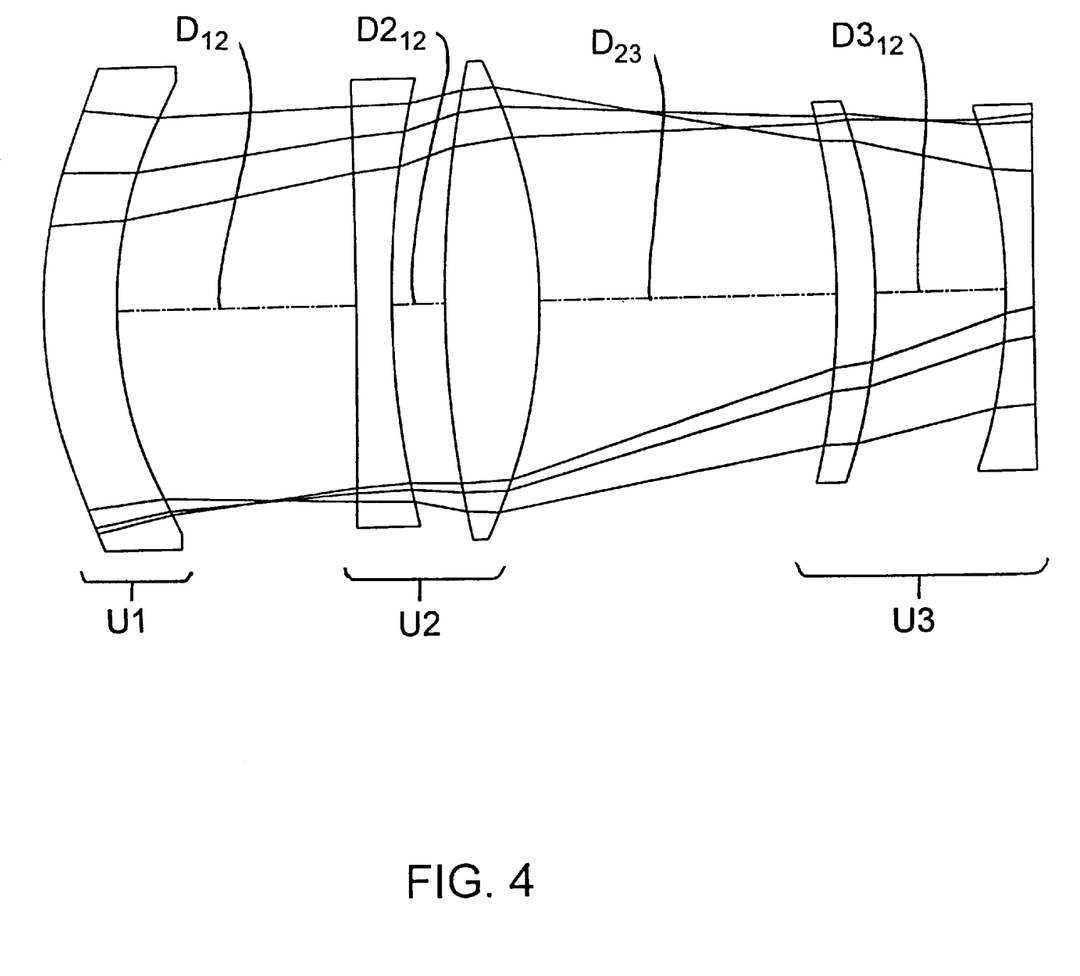

In connection with other aspects of the invention, the magnification of the projection lens is varied by changing the distance between the pixelized panel and the first, second, and third lens units while (a) holding constant the distance between the second and third lens units, and (b) varying the distance between the first lens unit and the second lens unit. The lenses of FIGS. 2–4 are of this type.

Figure 1A:
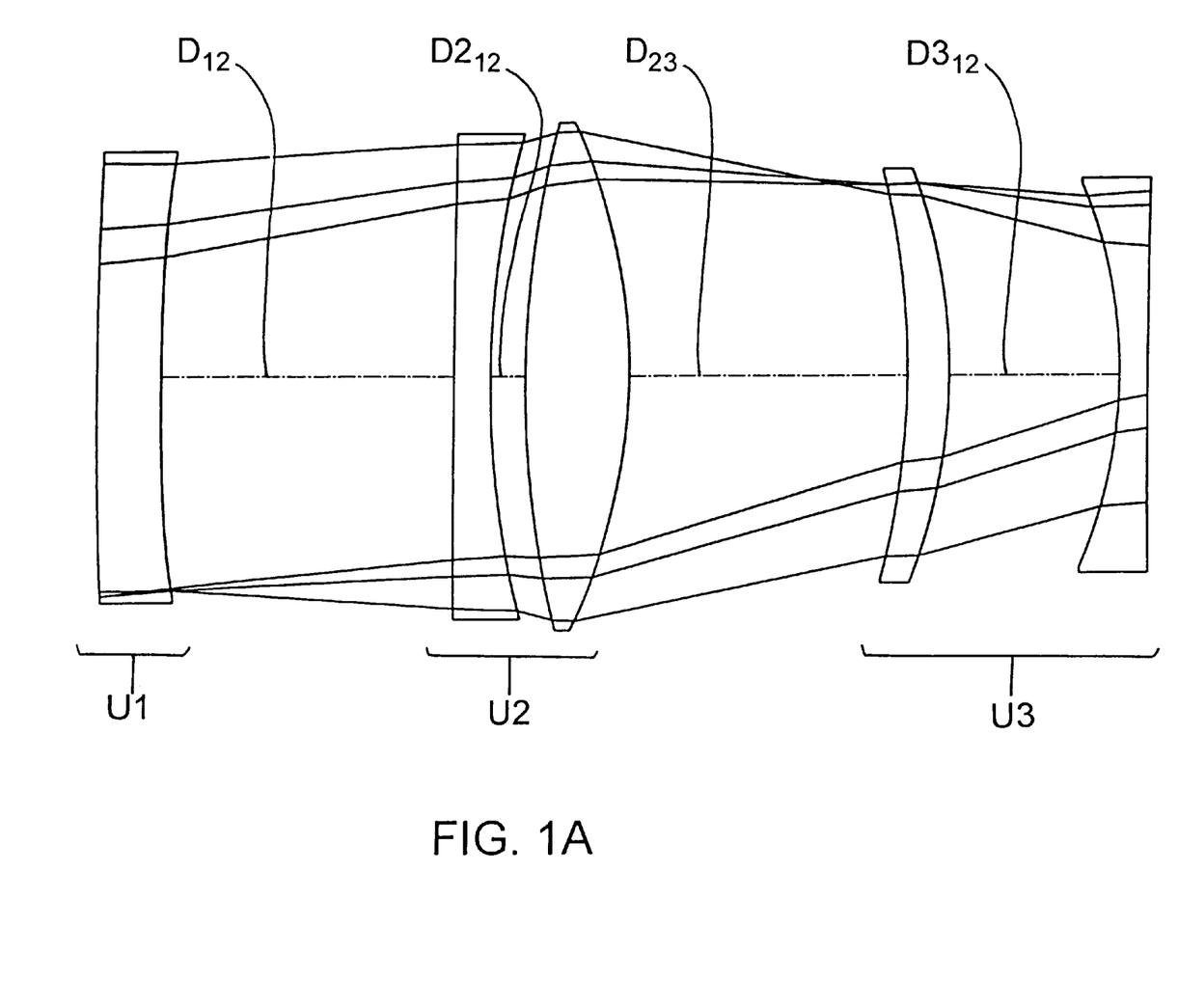
FIG. 1A is a schematic side view of a projection lens constructed in accordance with the invention.

If desired, for a particular magnification, a limited amount of zooming can be performed by varying the distance between the second and third lens units, the lens of FIG. 1 being of this type. Although not illustrated in the prescriptions set forth below, this feature can also be employed in the lens systems of FIGS. 2–4.

BRIEF DESCRIPTION OF THE DRAWINGS

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The projection lenses of the present invention have the general form of a corrector unit (unit 1) on the long conjugate side of a telephoto lens (units 2 and 3).

The corrector unit has a weak power, i.e., its power is less than 60%, and preferably less than 20%, of the combined power of first, second, and third lens units. The unit has at least one aspheric surface which contributes to the correction of the system's distortion which, as discussed above, needs to be highly corrected for lens systems used with pixelized panels. The distortion correction is generally better than about one percent at the image, and preferably better than about 0.5 percent. The aspheric surface(s) also contribute to the correction of spherical aberration, astigmatism, and coma.

In addition to correcting aberrations, the first lens unit also plays an important role in focusing of the lens system. In particular, the first lens unit is moved relative to the pixelized panel at a different rate than the second and third lens units to vary the magnification of the system while maintaining a high image quality. The first lens unit can thus be viewed as a front, focusing, aspherical corrector.

The second and third lens units have the form of a telephoto lens. Thus, the second lens unit has a positive power, the third lens unit has a negative power, and the two units are relatively widely spaced apart. The magnitude of the power of the second lens unit is greater than that of the third lens unit and both are substantially greater than the magnitude of the power of the first lens unit.

The output of the illumination system is generally located between the second and third lens units and thus these units preferably include only glass elements which can withstand the heat generated in the vicinity of that output. In particular, by using glass in these units and plastic in the front unit, a lens system whose optical properties are substantially insensitive to temperature variations is achieved.

As indicated above and discussed in more detail below, relative movement between the second and third units can be used to provide the lens with at least some zoom capabilities.

Color correction for the projection lens is provided by the second lens unit which comprises a negative lens element composed of a high dispersion material and a positive lens element composed of a low dispersion material. As discussed above, these elements are preferably composed of glass, although plastic materials can be used if desired.

In general terms, a high dispersion material is a material having a dispersion like flint glass and a low dispersion material is a material having a dispersion like crown glass. More particularly, high dispersion materials are those having V-values ranging from 20 to 50 for an index of refraction in the range from 1.85 to 1.5, respectively, and low dispersion materials are those having V-values ranging from 35 to 75 for the same range of indices of refraction.

For plastic lens elements, the low and high dispersion materials of choice are acrylic and styrene, respectively. Other plastics can, of course, be used if desired. For example, in place of styrene, polycarbonates and copolymers of polystyrene and acrylic (e.g., NAS) having flint-like dispersions can be used. See *The Handbook of Plastic Optics*, U.S. Precision Lens, Inc., Cincinnati, Ohio, 1983, pages 17–29.

Since the negative lens element and the positive lens element of the second lens unit have a combined power which is positive, the V-value of the high dispersion material of the negative lens element needs to be smaller than the V-value of low dispersion material of the positive lens element to achieve the desired color correction.

FIGS. 1 to 4 illustrate various projection lenses constructed in accordance with the invention. Corresponding prescriptions and optical properties appear in Tables 1 to 4, respectively. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1+[1-(1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–4.

The abbreviations used in the tables are as follows:

| | |
|---|---|
| EFL | effective focal length |
| FVD | front vertex distance |
| f/ | f-number |
| ENP | entrance pupil as seen from the long conjugate |
| EXP | exit pupil as seen from the long conjugate |
| BRL | barrel length |
| OBJ HT | object height |
| MAG | magnification |
| STOP | location of aperture stop |
| IMD | image distance |
| OBD | object distance |
| OVL | overall length. |

The designation "a" associated with various surfaces in the tables represents an aspheric surface, i.e., a surface for which at least one of D, E, F, G, H, or I in the above equation is not zero; and the designation "c" indicates a surface for which k in the above equations is not zero. All dimensions given in the tables are in millimeters. The tables are constructed on the assumption that light travels from left to right in the figures. In actual practice, the viewing screen will be on the left and the pixelized panel will be on the right, and light will travel from right to left. In particular, the references in the tables to objects and images are reversed from that used in the rest of the specification and in the claims.

Figure 1B:
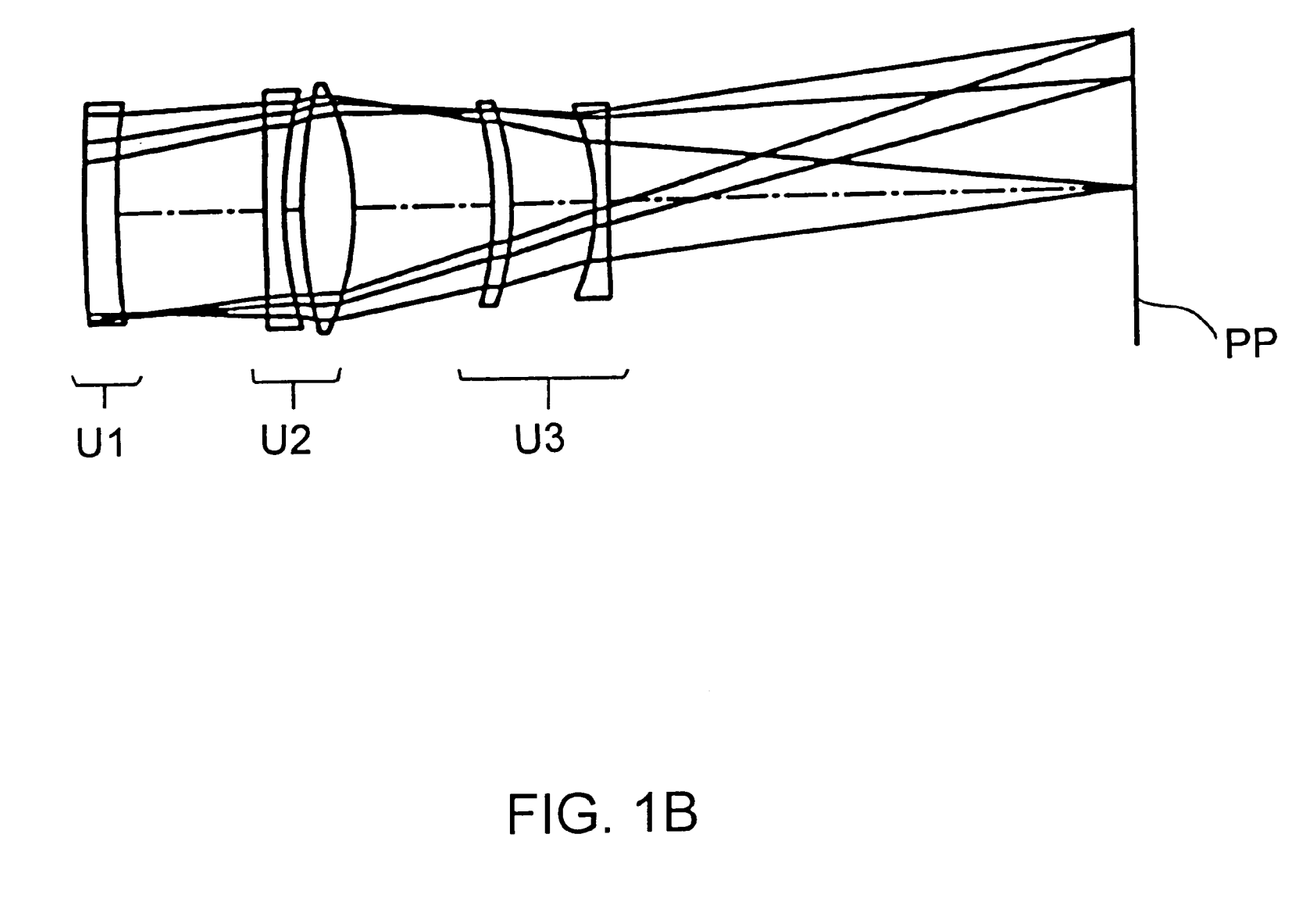
FIG. 1B shows the projection lens of FIG. 1A in combination with a pixelized panel (PP).

The pixelized panel is shown by the designation "PP" in FIG. 1B. The panel for which the lenses were designed, specifically, an LCD panel, had an effective diagonal of 218 millimeters when the offset of the panel from the lens system's optical axis is included.

In all of the tables, the first lens unit (U1) comprises surfaces 1–2, and the second lens unit (U2) comprises surfaces 3–6. In Tables 1–3, the third lens unit (U3) comprises surfaces 7–10, while in Table 4, it comprises surfaces 7–11, surface 9 being an optional vignetting surface.

As discussed above, the projection lenses of FIGS. 1–4 were designed using the pseudo-aperture stop/entrance pupil technique of Betensky, U.S. Pat. No. 5,313,330. In accordance with this approach, the illumination system is used to define the entrance pupil for the projection lens, with the entrance pupil being located at a constant position relative to the pixelized panel for all lens focal lengths and conjugates. The location of this pupil is determined by the substantially parallel light (substantially telecentric light) which passes through the pixelized panel from the illumination system.

The surface labeled "aperture stop" in Tables 1–4 constitutes the pseudo-aperture stop of the above Betensky patent. Its location corresponds to the location of the output of the illumination system. As can be seen in the subtables labeled "Variable Spaces," the distance from the pseudo-aperture stop to the pixelized panel is essentially constant for all magnifications of the projection lens systems of FIGS. 1–4 (see the column labeled "Image Distance"). For the magnifications shown, the variable space which defines the location of the aperture stop relative to the back surface of the projection lens is negative for each of Tables 1–4 corresponding to the illumination output being located within the space defined by the lens' front and back lens surfaces. It should be noted that although preferred, the pseudo-aperture stop approach does not have to be used in the design of the lenses of the invention. Rather, the lenses can be designed using a conventional aperture stop.

As also discussed above, the projection lenses of FIGS. 2–4 can be focused by changing the distance between the pixelized panel and the first, second, and third lens units while (a) holding constant the distance between the second and third lens units, and (b) varying the distance between the first lens unit and the second lens unit. As shown in the prescriptions for these lenses, the amount of movement of the first lens unit relative to the second lens unit is small compared to the overall movement of the lens system relative to the pixelized panel.

The projection lens of Example 1 has both focusing and zooming capabilities, the zooming capability being achieved by varying the spacing between the second and third units. The inclusion of a zooming capability allows for fine tuning of the image to, for example, fully fill a viewing screen.

Conventional mechanisms known in the art are used, to move the lens and its component parts during focusing and/or zooming.

Although focusing and zooming both involve magnification changes, the magnification changes are achieved in fundamentally different ways. Thus, during focusing, the focal length of the lens remains substantially constant as the image and object conjugates change, and the magnification change is a result of the change in the ratio of those conjugates. During zooming, on the other hand, the focal length changes while the image and object conjugates remain constant, and the magnification change is a result of the change in the focal length.

Positions 1–5 in Table 1 illustrate this difference with positions 1, 2, and 3 illustrate focusing of the lens, while positions 3, 4, and 5 illustrate zooming. It should be noted that the lens of this example includes means for accommodating for changes in the focus of the lens resulting from zooming. In particular, Table 1 shows some changes in conjugates during zooming which achieve these focus corrections.

The lens of Table 1 has a focus range (F) of 0.09, where the focus range is given by:

$$F = \max|h_O/h_I| - \min|h_O/h_I|,$$

where ho is the object height, $h_I$ is the magnified image height, and $\max|h_O/h_I|$ and $\min|h_O/h_I|$ are the maximum and minimum magnitudes, respectively, of the image-to-object magnification (minification) which the projection lens can achieve while maintaining a desired level of image quality.

The lens also has a zoom range (Z) of 0.12, where the zoom range is given by:

$$Z = 2*(\max|h_I| - \min|h_I|)/(\max|h_I| + \min|h_I|),$$

where $\max|h_I|$ and $\min|h_I|$ are the maximum and minimum magnitudes, respectively, of the image height as a result of zooming about a $|h_O/h_I|$ ratio in the focus range.

As is well known in the art, any lens which is capable of zooming can be "pushed" beyond its intended zoom range. Such "pushing", of course, leads to a degradation in the performance of the lens. The degradation, however, is generally not precipitous and generally does not affect all performance parameters at the same rate. Accordingly, as used herein, the zoom range is that range for which image quality does not fall below a specified criterion. In the case of the lens of Table 1, the criterion used for the zoom range was an MTF exceeding 65% at 5.6 cycles/mm through 85% of the field of the lens. This criterion, as opposed to, for example, distortion or lateral color, was used for this lens because the field of view for the lens is narrow.

Tables 5 and 6 summarize various properties of the lens systems of the invention. The BFL values are calculated for an object at infinity along the long conjugate of the system. As shown in Table 6, numerical limitations (1) and (2) are satisfied by the lens systems of FIGS. 1–4.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 |  | 1634.3740 | 20.00000 | ACRYLIC | 142.49 |
| 2 | ac | 1106.5900 | Space 1 |  | 140.38 |
| 3 |  | 6000.0001 | 12.00000 | FD14 | 151.86 |
| 4 |  | 301.7851 | 11.37822 |  | 153.30 |
| 5 |  | 322.8628 | 33.60000 | BACD18 | 159.78 |
| 6 |  | −195.1980 | Space 2 |  | 160.53 |
| 7 |  | −263.7858 | 13.00000 | BACD18 | 128.67 |

TABLE 1-continued

| | | | | | |
|---|---|---|---|---|---|
| 8 | −194.8775 | 54.52309 | | | 130.32 |
| 9 | −159.2364 | 9.00000 | FC5 | | 120.74 |
| 10 | 3900.0001 | Space 3 | | | 123.95 |
| 11 | Aperture stop | Image distance | | | 112.87 |

Symbol Description a - Polynomial asphere
c - Conic section
Conics

| Surface Number | Constant |
|---|---|
| 2 | −5.0000E−01 |

Even Polynomial Aspheres

| Surf. No. | D | E | F | G | H | I |
|---|---|---|---|---|---|---|
| 2 | 5.4286E−08 | 2.0878E−12 | −6.0772E−16 | 2.8570E−19 | −4.7940E−23 | 2.9585E−27 |

Variable Spaces

| Pos. No. | Space 1 T(2) | Space 2 T(6) | Space 3 T(10) | Focal Shift | Image Distance |
|---|---|---|---|---|---|
| 1 | 93.600 | 90.628 | −160.000 | 0.375 | 503.973 |
| 2 | 95.100 | 90.628 | −108.143 | −0.112 | 503.989 |
| 3 | 94.530 | 90.628 | −131.193 | 0.104 | 503.986 |
| 4 | 94.530 | 74.500 | −74.620 | 1.520 | 504.004 |
| 5 | 94.530 | 103.890 | −172.691 | −0.762 | 503.963 |

POS 1 System First Order Properties

OBJ. HT: −5100.0    f/ 4.50    MAG: −0.0200
STOP: 0.00 after surface 11.    DIA: 112.54
EFL:          582.058    FVD:          681.703    ENP:          73.2134
IMD:          503.973    BRL:          177.730    EXP:          0.000000
OBD:         −29718.4    OVL:         30400.1

POS 2 System First Order Properties

OBJ. HT: −940.00    f/ 4.66    MAG: −0.1100
STOP: 0.00 after surface 11.    DIA: 108.77
EFL:          581.922    FVD:          735.076    ENP:          155.811
IMD:          503.989    BRL:          231.087    EXP:          0.000000
OBD:         −5903.86    OVL:         6638.93

POS 3 System First Order Properties

OBJ. HT: −1456.0    f/ 4.50    MAG: −0.0700
STOP: 0.00 after surface 11.    DIA: 112.64
EFL:          581.974    FVD:          711.452    ENP:          116.957
IMD:          503.986    BRL:          207.467    EXP:          0.000000
OBD:         −8928.25    OVL:         9639.70

POS 4 System First Order Properties

OBJ. HT: −1366.0    f/ 5.00    MAG: −0.0745
STOP: 0.00 after surface 11.    DIA: 100.94
EFL:          618.995    FVD:          751.916    ENP:          63.4684
IMD:          504.005    BRL:          247.912    EXP:          0.000000
OBD:         −8950.51    OVL:         9702.43

POS 5 System First Order Properties

OBJ. HT: −1540.0    f/ 4.50    MAG: −0.0663
STOP: 0.00 after surface 11.    DIA: 112.86
EFL:          554.690    FVD:          683.193    ENP:          63.4684
IMD:          503.963    BRL:          179.231    EXP:          0.000000
OBD:         −8960.51    OVL:         9643.71

First Order Properties of Elements

| Element Number | Surface Numbers | | Power | f' |
|---|---|---|---|---|
| 1 | 1 | 2 | −0.14229E−03 | −7027.9 |
| 2 | 3 | 4 | −0.24165E−02 | −413.83 |
| 3 | 5 | 6 | 0.51380E−02 | 194.63 |

TABLE 1-continued

| | | | | |
|---|---|---|---|---|
| 4 | 7 | 8 | 0.92299E-03 | 1083.4 |
| 5 | 9 | 10 | -0.31995E-02 | -312.55 |

First Order Properties of Groups

| Group Number | Surface Numbers | | Power | f' |
|---|---|---|---|---|
| 1 | 1 | 2 | -0.14229E-03 | -7027.9 |
| 2 | 3 | 6 | 0.30208E-02 | 331.04 |
| 3 | 7 | 10 | -0.21764E-02 | -459.47 |

First Order Properties of the Lens

| Positon Number | Power | f' |
|---|---|---|
| 1 | 0.17180E-02 | 582.06 |
| 2 | 0.17184E-02 | 581.92 |
| 3 | 0.17183E-02 | 581.97 |
| 4 | 0.16155E-02 | 618.99 |
| 5 | 0.18028E-02 | 554.70 |

TABLE 2

| Surf. No. | Type | Radius | Thickness | Glass | Clear Aperture Diameter |
|---|---|---|---|---|---|
| 1 | | -185148.7093 | 14.97000 | ACRYLIC | 122.09 |
| 2 | ac | 550.2681 | Space 1 | | 122.36 |
| 3 | | 483.8345 | 11.00000 | F8 | 140.74 |
| 4 | | 192.2149 | 4.73853 | | 141.01 |
| 5 | | 207.6194 | 33.60000 | FCD1 | 143.22 |
| 6 | | -184.7353 | Space 2 | | 143.78 |
| 7 | | -274.0555 | 12.00000 | BACD5 | 120.65 |
| 8 | | -160.3742 | 57.42358 | | 121.40 |
| 9 | | -135.8544 | 8.00000 | FC5 | 108.72 |
| 10 | | 3900.0001 | Space 3 | | 111.90 |
| 11 | | Aperture stop | Image distance | | 98.01 |

Symbol Description a - Polynomial asphere
c - Conic section

Conics

| Surface Number | Constant |
|---|---|
| 2 | -5.0000E-01 |

Even Polynomial Aspheres

| Surf. No. | D | E | F | G | H | I |
|---|---|---|---|---|---|---|
| 2 | 6.1378E-08 | 2.4418E-12 | -5.5060E-16 | 3.2694E-19 | -7.2524E-23 | 5.7428E-27 |

Variable Spaces

| Pos. No. | Space 1 T(2) | Space 2 T(6) | Space 3 T(10) | Focal Shift | Image Distance |
|---|---|---|---|---|---|
| 1 | 89.735 | 108.498 | -160.000 | 0.104 | 503.021 |
| 2 | 90.505 | 108.498 | -108.335 | -0.415 | 503.990 |
| 3 | 90.347 | 108.498 | -131.356 | -0.206 | 503.994 |

POS 1 System First Order Properties

OBJ. HT: -5100.0   f/ 5.17   MAG: -0.0200
STOP: 0.00 after surface 11.   DIA: 97.951
EFL:   582.607   FVD:   683.986   ENP:   62.9351
IMD:   504.021   BRL:   179.965   EXP:   0.000000
OBD:   -29756.9   OVL:   30440.9

TABLE 2-continued

POS 2 System First Order Properties

| | | | | | |
|---|---|---|---|---|---|
| OBJ. HT: −940.00 | f/ 5.33 | MAG: −0.1100 | | | |
| STOP: 0.00 after surface 11. | | DIA: 95.056 | | | |
| EFL: | 581.102 | FVD: | 736.390 | ENP: | 144.385 |
| IMD: | 503.990 | BRL: | 232.400 | EXP: | 0.000000 |
| OBD: | −5915.35 | OVL: | 6651.74 | | |

POS 3 System First Order Properties

| | | | | | |
|---|---|---|---|---|---|
| OBJ. HT: −1460.0 | f/ 5.17 | MAG: −0.0700 | | | |
| STOP: 0.00 after surface 11. | | DIA: 98.006 | | | |
| EFL: | 582.973 | FVD: | 713.215 | ENP: | 106.047 |
| IMD: | 503.994 | BRL: | 209.221 | EXP: | 0.000000 |
| OBD: | −8940.83 | OVL: | 9654.04 | | |

First Order Properties of Elements

| Element Number | Surface Numbers | | Power | f' |
|---|---|---|---|---|
| 1 | 1 | 2 | −0.90003E−03 | −1111.1 |
| 2 | 3 | 4 | −0.18521E−02 | −539.93 |
| 3 | 5 | 6 | 0.49537E−02 | 201.87 |
| 4 | 7 | 8 | 0.15897E−02 | 629.04 |
| 5 | 9 | 10 | −0.37283E−02 | −268.22 |

First Order Properties of Groups

| Group Number | Surface Numbers | | Power | f' |
|---|---|---|---|---|
| 1 | 1 | 2 | −0.90003E−03 | −1111.1 |
| 2 | 3 | 6 | 0.32150E−02 | 311.05 |
| 3 | 7 | 10 | −0.18578E−02 | −538.26 |

First Order Properties of the Lens

| Positon Number | Power | f' |
|---|---|---|
| 1 | 0.17164E−02 | 582.61 |
| 2 | 0.17183E−02 | 581.97 |
| 3 | 0.17179E−02 | 582.10 |

TABLE 3

| Surf. No. | Type | Radius | Thickness | Glass | Clear Aperture Diameter |
|---|---|---|---|---|---|
| 1 | | 1252.8200 | 14.97000 | ACRYLIC | 122.30 |
| 2 | ac | 787.0785 | Space 1 | | 121.63 |
| 3 | | 1406.0749 | 11.00000 | FD8 | 131.79 |
| 4 | | 224.1674 | 9.24000 | | 132.24 |
| 5 | | 259.5466 | 28.50000 | BACD5 | 136.46 |
| 6 | | −193.9218 | Space 2 | | 137.10 |
| 7 | | −239.8299 | 12.00000 | BACD18 | 116.94 |
| 8 | | −157.8392 | 51.18000 | | 118.09 |
| 9 | | −143.1680 | 8.00000 | FC5 | 110.00 |
| 10 | | 3900.0001 | Space 3 | | 113.00 |
| 11 | | Aperture stop | Image distance | | 97.96 |

Symbol Description a - Polynomial asphere
c - Conic section
Conics

| Surface Number | Constant |
|---|---|
| 2 | −5.0000E−01 |

Even Polynomial Aspheres

| Surf. No. | D | E | F | G | H | I |
|---|---|---|---|---|---|---|

TABLE 3-continued

| | | | | | | |
|---|---|---|---|---|---|---|
| 2 | 5.2242E−08 | 2.1791E−12 | −7.1572E−16 | 3.7111E−19 | −7.7946E−23 | 6.0410E−27 |

Variable Spaces

| Pos. No. | Space 1 T(2) | Space 2 T(6) | Space 3 T(10) | Focal Shift | Image Distance |
|---|---|---|---|---|---|
| 1 | 97.240 | 101.191 | −160.030 | 0.062 | 503.997 |
| 2 | 98.383 | 101.191 | −107.978 | −0.243 | 503.995 |
| 3 | 98.079 | 101.191 | −131.096 | −0.089 | 503.996 |

POS 1 System First Order Properties

OBJ. HT: −5100.0    f/ 5.17    MAG: −0.0200
STOP: 0.00 after surface 11.    DIA: 97.925
EFL:        582.174    FVD:        677.288    ENP:    71.6279
IMD:        503.997    BRL:        173.291    EXP:    0.000000
OBD:      −29725.5    OVL:       30402.8

POS 2 System First Order Properties

OBJ. HT: −940.00    f/ 5.33    MAG: −0.1100
STOP: 0.00 after surface 11.    DIA: 95.014
EFL:        581.997    FVD:        730.481    ENP:    154.107
IMD:        503.995    BRL:        226.486    EXP:    0.000000
OBD:       −5906.22    OVL:        6636.70

POS 3 System First Order Properties

OBJ. HT: −1460.0    f/ 5.17    MAG: −0.0700
STOP: 0.00 after surface 11.    DIA: 97.964
EFL:        582.044    FVD:        707.060    ENP:    115.424
IMD:        503.996    BRL:        203.064    EXP:    0.000000
OBD:       −8930.65    OVL:        9637.71

First Order Properties of Elements

| Element Number | Surface Numbers | | Power | f' |
|---|---|---|---|---|
| 1 | 1 | 2 | −0.23074E−03 | −4333.8 |
| 2 | 3 | 4 | −0.25930E−02 | −385.66 |
| 3 | 5 | 6 | 0.52040E−02 | 192.16 |
| 4 | 7 | 8 | 0.14684E−02 | 681.01 |
| 6 | 9 | 10 | −0.35443E−02 | −282.15 |

First Order Properties of Groups

| Group Number | Surface Numbers | | Power | f' |
|---|---|---|---|---|
| 1 | 1 | 2 | −0.23074E−03 | −4333.8 |
| 2 | 3 | 6 | 0.28606E−02 | 349.57 |
| 3 | 7 | 10 | −0.18778E−02 | −532.54 |

First Order Properties of the Lens

| Position Number | Power | f' |
|---|---|---|
| 1 | 0.17177E−02 | 582.17 |
| 2 | 0.17182E−02 | 582.00 |
| 3 | 0.17181E−02 | 582.04 |

TABLE 4

| Surf. No. | Type | Radius | Thickness | Glass | Clear Aperture Diameter |
|---|---|---|---|---|---|
| 1 | ac | 152.0189 | 23.90000 | ACRYLIC | 155.65 |
| 2 | a | 144.8473 | Space 1 | | 145.34 |
| 3 | | −3900.0001 | 12.00000 | FD14 | 142.29 |
| 4 | | 323.5706 | 17.50377 | | 143.92 |
| 5 | | 374.5398 | 31.00000 | BACD18 | 152.91 |
| 6 | | −184.9560 | Space 2 | | 153.78 |
| 7 | | −266.9933 | 12.50000 | BACD18 | 120.79 |
| 8 | | −198.9568 | 12.51129 | | 121.83 |
| 9 | | ∞ | 30.00000 | | 116.40 |

TABLE 4-continued

| 10 | −184.7593 | Space 3 | FC5 | 113.86 |
| 11 | 3900.0001 | Space 3 | | 116.57 |
| 12 | Aperture stop | Image distance | | 112.99 |

Symbol Description a - Polynomial asphere
c - Conic section
Conics

| Surface Number | Constant |
|---|---|
| 2 | −5.0000E−01 |

Even Polynomial Aspheres

| Surf. No. | D | E | F | G | H | I |
|---|---|---|---|---|---|---|
| 1 | 9.3495E−09 | −7.0233E−12 | −6.5200E−16 | 5.8269E−21 | −1.2053E−24 | 3.0711E−28 |
| 2 | 4.8705E−08 | −8.3045E−12 | −7.3948E−16 | −7.2417E−20 | 1.2320E−23 | −9.8789E−29 |

Variable Spaces

| Pos. No. | Space 1 T(2) | Space 2 T(6) | Space 3 T(10) | Focal Shift | Image Distance |
|---|---|---|---|---|---|
| 1 | 78.210 | 98.959 | −160.000 | −0.177 | 503.994 |
| 2 | 79.754 | 98.959 | −108.039 | −0.729 | 503.862 |
| 3 | 79.420 | 98.959 | −131.082 | −0.344 | 504.010 |

POS 1 System First Order Properties

OBJ. HT: −5100.0    f/ 4.50    MAG: −0.0200
STOP: 0.00 after surface 12.    DIA: 112.66
EFL:    582.000    FVD:    669.578    ENP:    86.5199
IMD:    503.994    BRL:    165.584    EXP:    0.000000
OBD:    −29701.2    OVL:    30370.8

POS 2 System First Order Properties

OBJ. HT: −940.00    f/ 4.60    MAG: −0.1100
STOP: 0.00 after surface 12.    DIA: 110.29
EFL:    582.015    FVD:    722.951    ENP:    169.357
IMD:    503.862    BRL:    219.089    EXP:    0.000000
OBD:    −5890.56    OVL:    6613.51

POS 3 System First Order Properties

OBJ. HT: −1460.0    f/ 4.50    MAG: −0.0700
STOP: 0.00 after surface 12.    DIA: 112.73
EFL:    582.012    FVD:    699.722    ENP:    130.767
IMD:    504.010    BRL:    195.711    EXP:    0.000000
OBD:    −8914.33    OVL:    9614.05

First Order Properties of Elements

| Element Number | Surface Numbers | | Power | f' |
|---|---|---|---|---|
| 1 | 1 | 2 | 0.16340E−04 | 61199. |
| 2 | 3 | 4 | −0.25756E−02 | −388.26 |
| 3 | 5 | 6 | 0.50673E−02 | 197.34 |
| 4 | 7 | 8 | 0.88032E−03 | 1135.9 |
| 5 | 10 | 11 | −0.27749E−02 | −360.38 |

First Order Properties of Groups

| Group Number | Surface Numbers | | Power | f' |
|---|---|---|---|---|
| 1 | 1 | 2 | 0.16340E−04 | 61199. |
| 2 | 3 | 6 | 0.28956E−02 | 345.35 |
| 3 | 7 | 11 | −0.18408E−02 | −543.24 |

First Order Properties of the Lens

| Position Number | Power | f' |
|---|---|---|
| 1 | 0.17182E−02 | 582.00 |

TABLE 4-continued

| | | |
|---|---|---|
| 2 | 0.17182E−02 | 582.01 |
| 3 | 0.17182E−02 | 582.01 |

TABLE 5

| Example | $f_0$ | $f_1$ | $f_2$ | $f_3$ | BFL |
|---|---|---|---|---|---|
| 1 | 582.1 | −7027.9 | 331.04 | −459.47 | 332.4 |
| 2 | 582.6 | −1111.1 | 311.05 | −538.26 | 332.5 |
| 3 | 582.2 | −4333.8 | 349.57 | −532.54 | 332.4 |
| 4 | 582.0 | 61199.0 | 345.35 | −543.24 | 332.6 |

TABLE 6

| Example | $f_0/|f_1|$ | BFL/$f_0$ |
|---|---|---|
| 1 | 0.083 | 0.57 |
| 2 | 0.52 | 0.57 |
| 3 | 0.13 | 0.57 |
| 4 | 0.01 | 0.57 |

What is claimed is:

1. A projection lens for forming an image of an object which, in order from its image end to its object end, consists of:
   (A) a first lens unit having a weak power and comprising at least one aspheric surface;
   (B) a second lens unit having a positive power and comprising a negative lens element composed of a high dispersion material and a positive lens element composed of a low dispersion material;
   (C) a third lens unit having a negative power and comprising a positive meniscus lens element and a negative lens element; and
   (D) an optional field lens which is nearer to the object than to the third lens unit;
   wherein:
   $f_0/|f_1|<0.6$; and
   $BFL/f_0>0.3$;
   where:
   (i) $f_0$ is the effective focal length of the combination of the first, second, and third lens units;
   (ii) $f_1$ is the effective focal length of the first lens unit; and
   (iii) BFL is the back focal length of the combination of the first, second, and third lens units for an object located at infinity along the long conjugate side of the projection lens.

2. The projection lens of claim 1 wherein:
$f_0/|f_1|<0.2$.

3. The projection lens of claim 1 wherein:
$BFL/f_0>0.5$.

4. The projection lens of claim 1 wherein the first lens unit comprises two aspheric surfaces.

5. The projection lens of claim 1 wherein the first lens unit comprises only plastic lens elements and the second and third lens units comprise only glass lens elements.

6. The projection lens of claim 1 wherein the projection lens has a distortion which is less than about one percent at the image.

7. The projection lens of claim 1 wherein the object is a pixelized panel.

8. The projection lens of claim 7 wherein the lens has a lateral color aberration which is less than about a half a pixel at the object.

9. The projection lens of claim 1 wherein the first lens unit consists of a single lens element.

10. The projection lens of claim 1 wherein the negative lens element of the second lens unit is nearer to the image than the positive lens element of that lens unit.

11. The projection lens of claim 1 wherein the second lens unit consists of two lens elements.

12. The projection lens of claim 1 wherein the positive meniscus lens element of the third lens unit is nearer to the image than the negative lens element of that lens unit.

13. The projection lens of claim 1 wherein the third lens unit consists of two lens elements.

14. The projection lens of claim 1 wherein:
   $D2_{12}<D_{12}$
   $D2_{12}<D_{23}$
   $D3_{12}<D_{23}$
   where:
   (a) $D_{12}$ is the distance between the first and second lens units measured from the last surface of the first unit to the first surface of the second unit;
   (b) $D_{23}$ is the distance between the second and third lens units measured from the last surface of the second unit to the first surface of the third unit;
   (c) $D2_{12}$ is the distance between the negative and positive lens elements of the second lens unit measured between the facing surfaces of those elements; and
   (d) $D3_{12}$ is the distance between the negative and positive lens elements of the third lens unit measured between the facing surfaces of those elements.

15. A projection lens for forming an image of an object which, in order from its image end to its object end, comprises:
   (A) a first lens unit having a weak power and comprising at least one aspheric surface;
   (B) a second lens unit having a positive power and comprising a negative lens element composed of a high dispersion material and a positive lens element composed of a low dispersion material;
   (C) a third lens unit having a negative power and comprising a positive meniscus lens element and a negative lens element; and
   (D) an optional field lens which is nearer to the object than to the third lens unit;
   wherein
   $f_0|f_1|<0.6$; and
   $BFL/f_0>0.3$;
   (i) $f_0$ is the effective focal length of the combination of the first, second, and third lens units;
   (ii) $f_1$ is the effective focal length of the first lens unit;
   (iii) BFL is the back focal length of the combination of the first, second, and third lens units for an object located at infinity along the long conjugate side of the projection lens; and
   (iv) the projection lens has a distortion which is less than about one percent at the image.

16. The projection lens of claim 15 wherein the projection lens has a distortion which is less than about one half a percent at the image.

17. A projection lens for forming an image of an object which, in order from its image end to its object end, consists of:
- (A) a first lens element having a weak power and comprising at least one aspheric surface;
- (B) a second lens unit having a positive power and consisting, in order from its image end to its object end, of: a negative lens element composed of a high dispersion material and a positive lens element composed of a low dispersion material;
- (C) a third lens unit having a negative power and consisting, in order from its image end to its object end, of: a positive meniscus lens element and a negative lens element; and
- (D) an optional field lens which is nearer to the object than to the third lens unit;

wherein:

$f_0/|f_1| < 0.6$; and $BFL/f_0 > 0.3$;

where:
- (i) $f_0$ is the effective focal length of the combination of the first lens element and the second and third lens units;
- (ii) $f_1$ is the effective focal length of the first lens element; and
- (iii) BFL is the back focal length of the combination of the first lens element and the second and third lens units for an object located at infinity along the long conjugate side of the projection lens.

18. A projection lens system for forming an image of an object, said system comprising:
- (A) an illumination system comprising a light source and illumination optics which forms an image of the light source, said image of the light source being the output of the illumination system;
- (B) a pixelized panel which comprises the object; and
- (C) a projection lens which, in order from its image end to its object end, comprises:
  - (a) a first lens unit having a weak power and comprising at least one aspheric surface;
  - (b) a second lens unit having a positive power and comprising a negative lens element composed of a high dispersion material and a positive lens element composed of a low dispersion material;
  - (c) a third lens unit having a negative power and comprising a positive meniscus lens element and a negative lens element; and
  - (d) an optional field lens which is nearer to the object than to the third lens unit;

wherein
  - (i) $f_0/|f_1| < 0.6$;
  - (ii) $f_0$ is the effective focal length of the combination of the first, second, and third lens units; and
  - (iii) $f_1$ is the effective focal length of the first lens unit.

19. The projection lens system of claim 19 wherein said projection lens has an entrance pupil whose location substantially corresponds to the location of the output of the illumination system.

20. The projection lens system of claim 19 wherein the focus of the projection lens system is varied by changing the distance between the pixelized panel and the first, second, and third lens units while (a) holding constant the distance between the second and third lens units, and (b) varying the distance between the first lens unit and the second lens unit.

21. The projection lens system of claim 19 wherein:

the focus of the projection lens system is varied by (a) changing the distance between the pixelized panel and the first, second, and third lens units and (b) varying the distance between the first lens unit and the second lens unit; and the focal length of the projection lens is changed by varying the distance between the second and third lens units.

* * * * *